G. A. LYON.
NON-SKIDDING ATTACHMENT FOR WHEEL TIRES.
APPLICATION FILED OCT. 29, 1909.
1,137,506.
Patented Apr. 27, 1915.
2 SHEETS—SHEET 1.
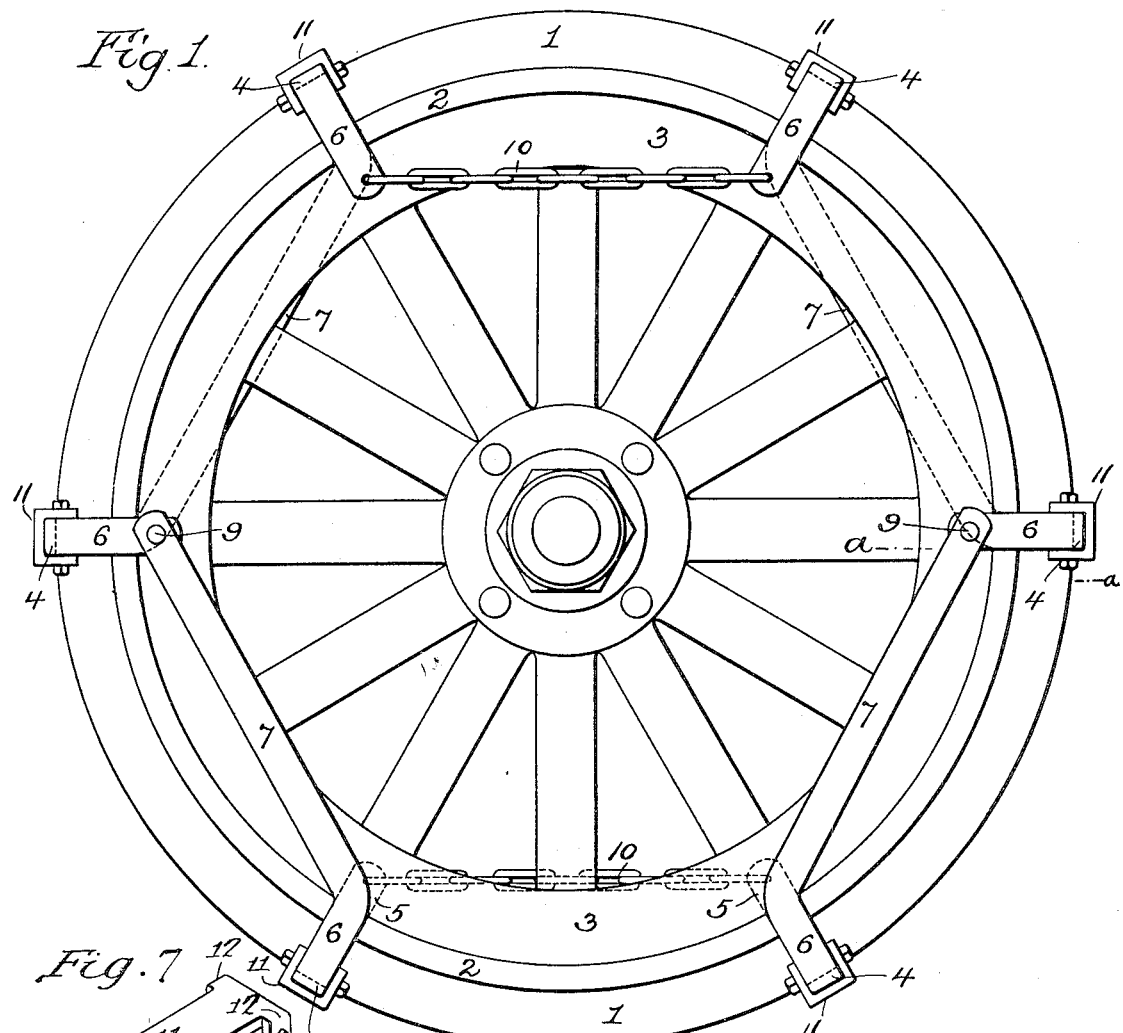
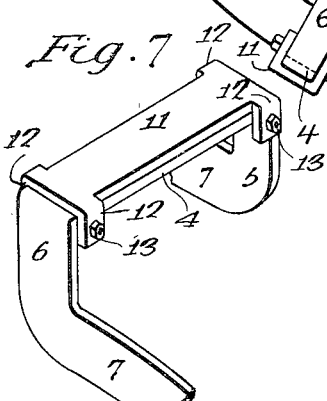
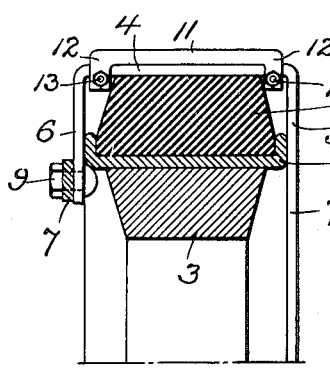
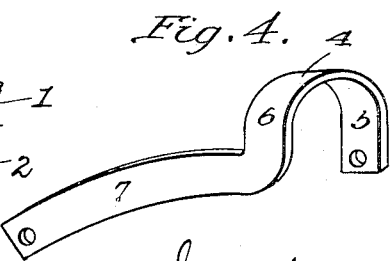
Witnesses
Harry L. Smith
Hamilton D. Turner
Inventor
George Albert Lyon
by his Attorneys
Smith & Frazier

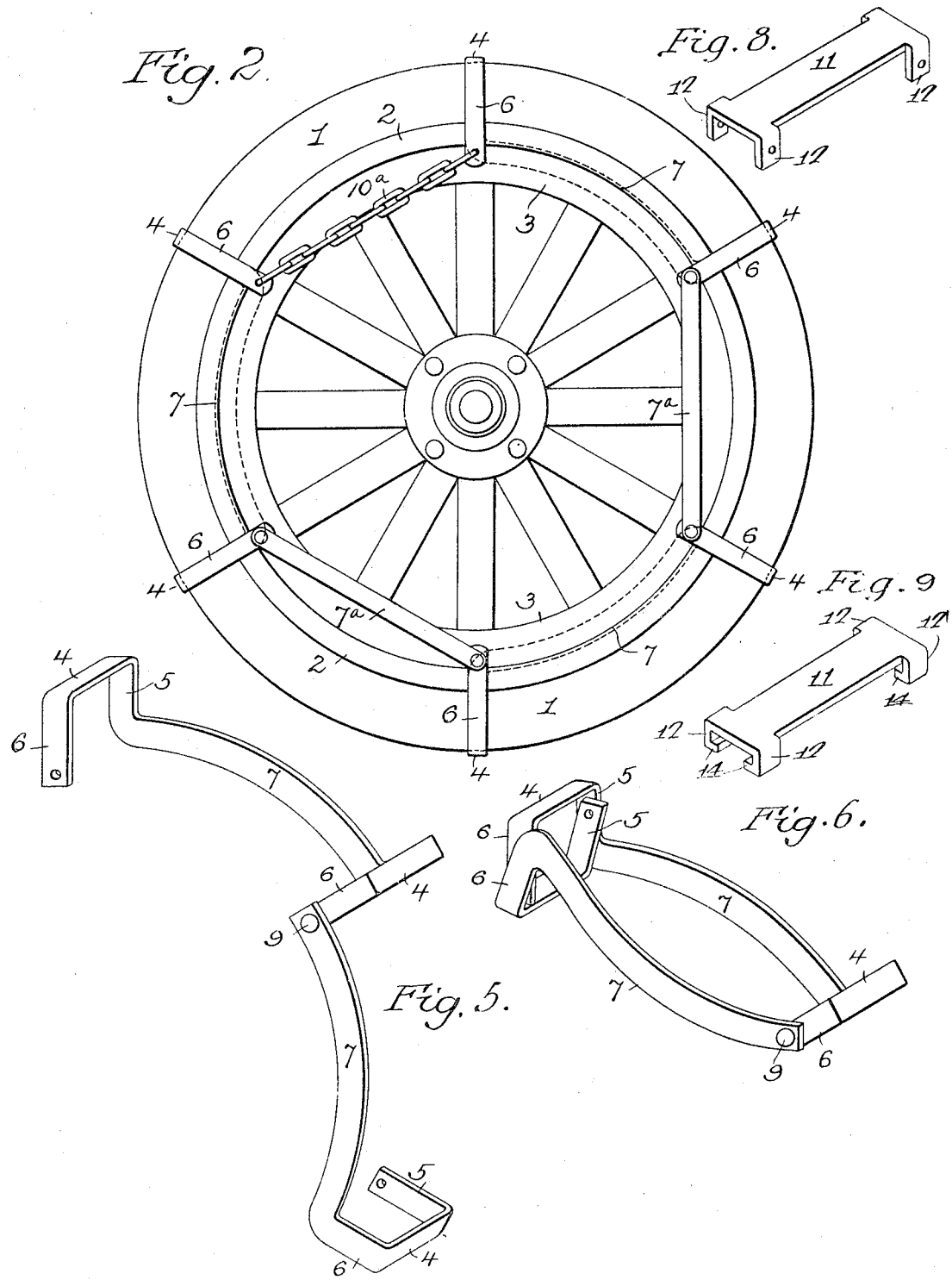

UNITED STATES PATENT OFFICE.

GEORGE ALBERT LYON, OF PHILADELPHIA, PENNSYLVANIA.

NON-SKIDDING ATTACHMENT FOR WHEEL-TIRES.

1,137,506.  Specification of Letters Patent.  Patented Apr. 27, 1915.

Application filed October 29, 1909. Serial No. 525,283.

*To all whom it may concern:*

Be it known that I, GEORGE ALBERT LYON, a citizen of the United States, residing in Philadelphia, Pennsylvania, have invented certain Improvements in Non-Skidding Attachments for Wheel-Tires, of which the following is a specification.

My invention consists of certain modifications of or improvements in the non-skidding attachment for wheel tires constituting the subject of my application, Serial No. 499,919, filed June 3, 1909, one of the objects of my present invention being to so construct and connect the sections of the attachment that the same can be folded into small space, and a further object being to so construct the tread members of the attachment as to increase their wear-resisting power and enable them to better prevent the skidding of the wheel.

These objects I attain in the manner hereinafter set forth, reference being had to the accompanying drawings, in which—

Figure 1 is a side elevation of a solid tired wheel with one form of my improved anti-skidding attachment applied thereto; Fig. 2 is a like view, illustrating another construction of the attachment; Fig. 3 is a transverse section on the line *a—a*, Fig. 1; Fig. 4 is a perspective view of one of the members of the attachment shown in Fig. 1 but with a rounded instead of a flat-tread member; Fig. 5 is a perspective view of one of the sections of the attachment shown in Fig. 1, showing its members extended; Fig. 6 is a perspective view of the same, showing its members folded; Fig. 7 is a perspective view of part of the attachment shown in Fig. 1; Fig. 8 is a perspective view of the shoe detached therefrom; and Fig. 9 is a perspective view of a modified form of shoe in accordance with my invention.

Referring in the first instance to Figs. 1 and 3, 1 represents the elastic tire of the wheel, 2 the metal rim and 3 the wooden felly of the wheel, all of which may be constructed in accordance with any of the methods now in use.

The non-skidding attachment comprises two sections, each consisting of two members pivotally connected together. One of these members comprises a pair of treads 4 each with inwardly extending side bars 5 and 6, one on each side of the tire, the bars 5 on one side of the tire being rigidly connected by a longitudinal bar 7, preferably integral with the side bars of the treads. The other member of the section comprises a single tread 4 with inwardly projecting side bars 5 and 6 and a longitudinal bar 7, the latter being rigidly connected with the side bar 6 of said member and being connected by a bolt, rivet or other pivotal connection 9 to the corresponding side bar 6 of the other member of the section.

The two sections of the attachment are united by chains 10 or other equivalent adjustable connections, one of these chains connecting the side bars 5 of the single tread members of the attachment and the other connecting the side bars 6 of the double tread members thereof.

By reason of the pivotal connection of the members of each section of the attachment, the same can be folded into relatively small compass for storage or transportation as shown in Fig. 6, while, owing to the fact that each of the longitudinal side bars 7 is rigidly connected to at least one of the treads of the attachment, a sufficiently rigid connection is provided between the members to cause one tread to so influence or control the next adjoining tread as to prevent rocking movement of either of the treads upon the surface of the tire.

In order to better enable the treads of the attachment to resist the wear to which they are subjected, or to insure a firmer grip of the same in mud, sand, snow, or other relatively soft and yielding road surfaces, I provide each tread with a shoe 11, which lies upon the top of the tread and has at each end depending side wings 12, the latter extending down below the level of the tread on opposite sides of the wheel tire, as shown in Fig. 3, and these depending portions of the wings being connected below the tread by bolts 13, each provided with a suitable nut whereby it is secured in place (see Figs. 7 and 8). This construction is adopted when the shoes are intended for ready application to or removal from the treads of the attachment, but, in some cases, I may permanently attach the shoes to the tread by bending in the lower ends of the wings 12 of each shoe beneath the tread, as shown for instance at 14, in Fig. 9.

The attachment shown in Fig. 2 comprises three members, each consisting of a pair of treads 4, one at each end of the member, each of these treads having opposite side bars 5 and 6, the side bars 5 of the two treads being rigidly connected by a bar 7 integral therewith, and the side bars 6 of the treads of one of the members being pivotally connected to longitudinal bars 7ᵃ which are also pivotally connected to the side bars 6 of the adjacent treads of the adjoining members, the side bars 6 of the other treads of said latter members being connected together by a chain 10ᵃ, or other device which is adjustable as to length and can be readily attached or detached, as for instance by hooked links at the ends.

The side bars 7 of the members of the attachment shown in Fig. 4 are preferably curved to conform to the curve of the rim of the wheel and thereby prevent contact of said side bars with the spur or sprocket wheels or drive chains which frequently constitute part of the driving mechanism of the vehicle, and are disposed closely to the inner side of the rim or felly of the wheel.

I claim:

1. A non-skidding wheel tire attachment having treads with depending side members disposed laterally beyond the tire, said treads being provided with shoes having wings which engage the treads and are disposed between the tire and the depending side members of the treads.

2. A non-skidding wheel tire attachment having treads with depending side members disposed laterally beyond the tire, said treads being provided with shoes having wings which engage said treads and are secured thereto at points between the tire and the depending side members of the treads.

3. A non-skidding wheel tire attachment having treads projecting laterally beyond the tire, said treads being provided with shoes having wings which engage said projecting portions of the tread and are secured thereto by transverse bolts passing under the same.

4. A non-skidding wheel tire attachment consisting of members, each comprising a tread with opposite side bars and a longitudinal connecting bar all rigidly joined together, said connecting bar being pivoted directly to a side bar of an adjoining member.

5. A non-skidding wheel tire attachment consisting of sections each comprising a member having two treads, each with opposite side bars and a longitudinal bar connecting the side bars on one side of the tire, and another member having a single tread with side bars and a longitudinal bar which projects from one of said side bars and has pivotal connection with one of the side bars of the first member.

In testimony whereof, I have signed my name to this specification, in the presence of two subscribing witnesses.

GEORGE ALBERT LYON.

Witnesses:
HAMILTON D. TURNER,
KATE A. BEADLE.